(12) United States Patent
Brickell et al.

(10) Patent No.: US 7,844,614 B2
(45) Date of Patent: Nov. 30, 2010

(54) APPARATUS AND METHOD FOR ENHANCED REVOCATION OF DIRECT PROOF AND DIRECT ANONYMOUS ATTESTATION

(75) Inventors: Ernest F. Brickell, Portland, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 439 days.

(21) Appl. No.: 11/948,861

(22) Filed: Nov. 30, 2007

(65) Prior Publication Data

US 2008/0270790 A1    Oct. 30, 2008

Related U.S. Application Data

(60) Provisional application No. 60/915,031, filed on Apr. 30, 2007.

(51) Int. Cl.
*G06F 17/30* (2006.01)
(52) U.S. Cl. ...................................................... 707/756
(58) Field of Classification Search ................. 707/756; 705/18, 50; 711/164; 713/150, 183, 184
See application file for complete search history.

(56) References Cited

U.S. PATENT DOCUMENTS

| | | | | | |
|---|---|---|---|---|---|
| 4,529,870 | A | * | 7/1985 | Chaum | 235/380 |
| 7,490,070 | B2 | * | 2/2009 | Brickell | 705/75 |
| 2004/0260926 | A1 | * | 12/2004 | Arditti Modiano et al. | 713/170 |
| 2005/0010535 | A1 | * | 1/2005 | Camenisch | 705/74 |
| 2006/0010079 | A1 | | 1/2006 | Brickell | |
| 2007/0101138 | A1 | * | 5/2007 | Camenisch | 713/168 |
| 2007/0192580 | A1 | * | 8/2007 | Challener et al. | 713/2 |
| 2008/0046581 | A1 | * | 2/2008 | Molina et al. | 709/229 |

FOREIGN PATENT DOCUMENTS

KR    10-2006-0003601    1/2006

OTHER PUBLICATIONS

Brickell, E., et al., "SafeID: A direct anonymous attestation scheme with enhanced revocation", *Intel Corporation*, (Apr. 26, 2007), 1-23.
Funabiki, N., et al., "A proposal of anonymous IEEE802.1X authetication protocol for wireless networks", *IEEE*, 26-31.
Ge, H., et al., "A group signature scheme with signature claiming and variable linkability", *IEEE*, (2006), 497-504.
Intel Corporation, Korean Notice of Preliminary Rejection dated Apr. 21, 2010 for KR 10-2008-69771.

* cited by examiner

*Primary Examiner*—Cheryl Lewis
(74) *Attorney, Agent, or Firm*—Blakely, Sokoloff, Taylor & Zafman LLP

(57)    ABSTRACT

In some embodiments, a method and apparatus for enhanced revocation of direct proof and direct anonymous attestation are described. In one embodiment a trusted hardware device verifies that membership of the device within a trusted membership group is not revoked according to a revocation list received with a challenge request from a verifier. Once such verification is performed, the device convinces the verifier of possessing cryptographic information without revealing unique, device identification information of the trusted hardware device or the cryptographic information. In one embodiment, the trusted hardware device computes a digital signature on a message received with the challenge request to the verifier if membership of the anonymous hardware device within a trusted membership group is verified. In one embodiment, the verifier authenticates the digital signature according to a public key of the trusted membership group to enable a trusted member device to remain anonymous to the verifier. Other embodiments are described and claimed.

30 Claims, 10 Drawing Sheets

APPARATUS AND METHOD FOR ENHANCED REVOCATION OF DIRECT PROOF AND DIRECT ANONYMOUS ATTESTATION

RELATED APPLICATIONS

This application claims the benefit of U.S. Provisional Application No. 60/915,031 filed Apr. 30, 2007. The present application is related to co-pending U.S. patent application Ser. No. 11/778,804 filed Jul. 17, 2007, entitled "AN APPARATUS AND METHOD FOR DIRECT ANONYMOUS ATTESTATION FROM BILINEAR MAPS" and co-pending U.S. patent application Ser. No. 11/948,862 filed Nov. 30, 2007, entitled "AN APPARATUS AND METHOD FOR ISSUER BASED REVOCATION OF DIRECT PROOF AND DIRECT ANONYMOUS ATTESTATION".

FIELD OF THE INVENTION

One or more embodiments of the invention relate generally to the field of cryptography. More particularly, one or more of the embodiments of the invention relates to a method and apparatus for enhanced revocation of direct proof and direct anonymous attestation.

BACKGROUND OF THE INVENTION

For many modern communication systems, the reliability and security of exchanged information is a significant concern. To address this concern, the Trusted Computing Platform Alliance (TCPA) developed security solutions for platforms. In accordance with a TCPA specification entitled "Main Specification Version 1.1b," published on or around Feb. 22, 2002, each personal computer (PC) is implemented with a trusted hardware device referred to as a Trusted Platform Module (TPM). Each TPM contains a unique endorsement key pair (EK), which features a public EK key (PUBEK) and a private EK key (PRIVEK). The TPM typically has a certificate for the PUBEK signed by the manufacturer.

During operation, an outside party (referred to as a "verifier") may require authentication of the TPM. This creates two opposing security concerns. First, the verifier needs to be sure that requested authentication information is really coming from a valid TPM. Second, an owner of a PC including the TPM wants to maintain as much privacy as possible. In particular, the owner of the PC wants to be able to provide authentication information to different verifiers without those verifiers being able to determine that the authentication information is coming from the same TPM.

One proposed solution to these security issues is to establish a Trusted Third Party (TTP). For instance, the TPM would create an Attestation Identify Key pair (AIK), namely a public AIK key and a private AIK key. The public AIK key could be placed in a certificate request signed with the PRIVEK, and subsequently sent to the TTP. The certificate for the PUBEK would also be sent to the TTP. Once the certificates are received, the TTP would check that the signed certificate request is valid, and if valid, the TTP would issue a certificate to the TPM.

Once a certificate is issued, the TPM would then use the public AIK and the TTP issued certificate when the TPM received a request from a verifier. Since the AIK and certificate would be unrelated to the EK, the verifier would get no information about the identity of the TPM or PC implemented with the TPM. In practice, the above-identified approach is problematic because it requires TTPs to be established. Identifying and establishing various parties that can serve as TTPs has proven to be a substantial obstacle.

Another proposed solution is set forth in a co-pending U.S. application Ser. No. 10/306,336, filed Nov. 27, 2002, which is also owned by the assignee of the present application. The proposed solution utilizes a direct proof method whereby the TPM could prove directly (without requiring a trusted third party) that an AIK has been created by a valid TPM without revealing the identity of the TPM. In that solution, each TPM has a unique private key. Unfortunately, an adversary may take a TPM and, using sophisticated means, extract the unique private key from the TPM.

In the Direct Proof method, there is a method given to be able to revoke a key that has been removed from a TPM. During the Direct Proof protocol, the TPM gets a base, h, and computes and reveals $k = h^f \bmod n$, where n is part of the public key, and f is part of the unique key held by the TPM. So if a verifier receives a value f0 that has been removed from a TPM, the verifier can check whether the Direct Proof was created using this value f0, by performing the computation $k0 = h^{f0} \bmod n$, and checking to see if $k = k0$. For if $k = k0$, then the Direct Proof was created using f0, and if k is not equal to k0, then the Direct Proof was created using some other private key.

One limitation of this method is that it requires that the verifier obtain the value of f0. It is conceivable that the adversary could have obtained the secret unique value from a TPM, and used it in a way that the verifier could not obtain the value of f0, but could know that for a particular k0, that value of f0 had been removed from the TPM. In U.S. application Ser. No. 10/306,336, one method was presented for dealing with this problem. It required the verifier to provide the value of the base h for each TPM to use when interacting with that verifier. This has the property that it allows the verifier to be able to link all interactions with that verifier.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
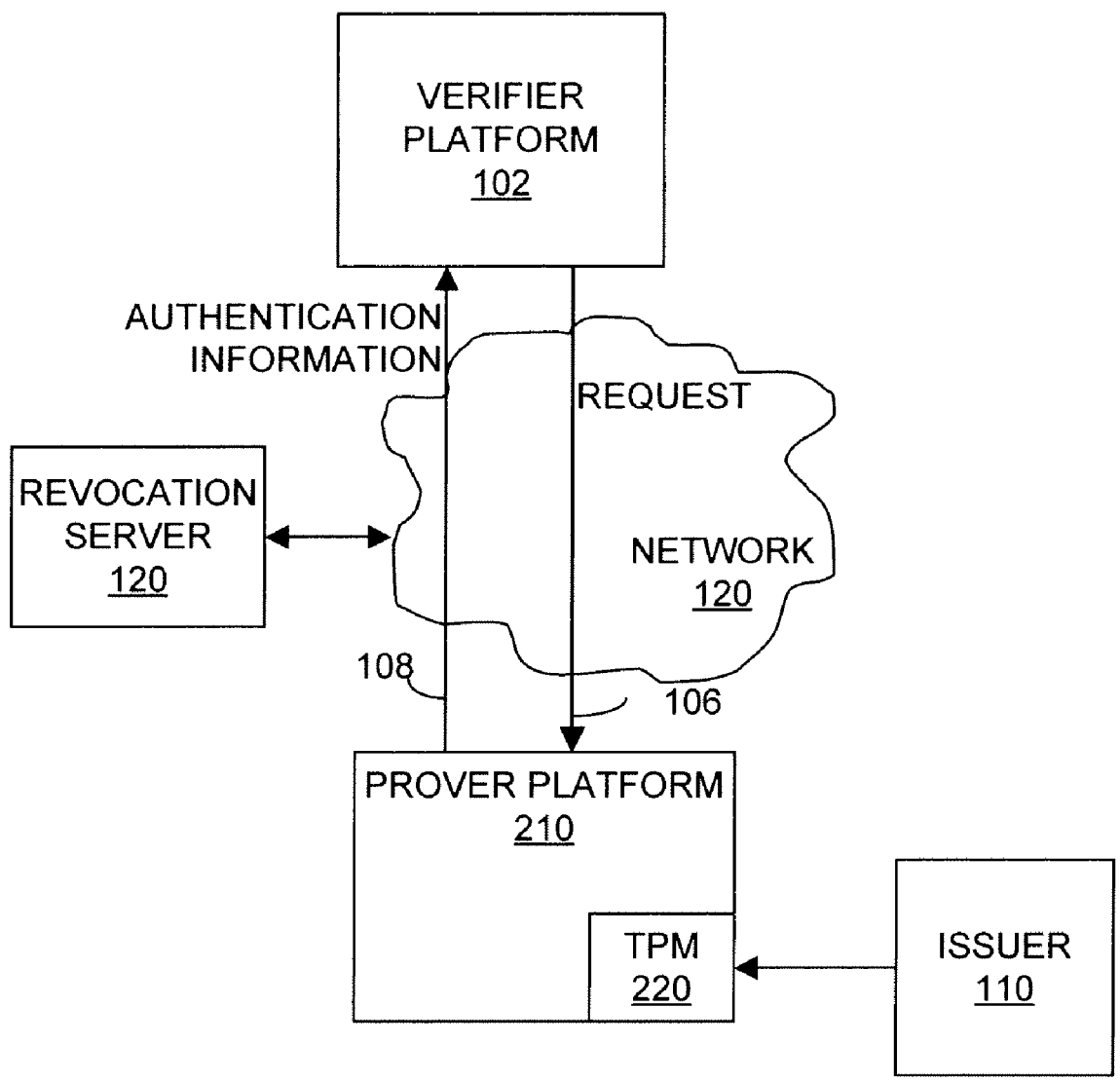
FIG. 1 illustrates a system featuring a platform implemented with a Trusted Platform Module (TPM) that operates in accordance with one embodiment.

A method and apparatus for enhanced revocation of direct proof and direct anonymous attestation are described. In one embodiment a trusted hardware device verifies that membership of the device within a trusted membership group is not revoked according to a revocation list received with a challenge request from a verifier. Once such verification is performed, the device convinces the verifier of possessing cryptographic information without revealing unique, device identification information of the trusted hardware device or the cryptographic information. In one embodiment, the trusted hardware device computes a digital signature on a message received with the challenge request to the verifier if membership of the anonymous hardware device within a trusted membership group is verified.

In one embodiment, the verifier authenticates the digital signature according to a public key of the trusted membership group to enable a trusted member device to remain anonymous to the verifier. In one embodiment, enhanced revocation is provided by a methodology in which computations by TPM the involve exponentiations using a cryptographic (private member) key as an exponent, including but not limited to a direct proof (DP) protocol, a direct anonymous attestation (DAA) protocol or other like attestation protocol. In one embodiment, the trusted hardware device proves to a verifier that a group of digital signatures used in attestation protocols (e.g., a "DP signature," a "DAA signature") are not based on a cryptographic key of the device.

In one embodiment, the verifier may issue a revocation list with a challenge request to the trusted hardware device to request that the device prove that a cryptographic key held by the trusted hardware device was not used to form any one of a group of DP/DAA signatures suspected of being compromised (suspect signatures). For one embodiment, the functionality of the TPM, which is configured to prove to a verifier that information (e.g., cryptographic key, digital signature, digital certificate, etc.) from the TPM is uncompromised, is deployed as firmware. However, it is contemplated that such functionality may be deployed as dedicated hardware or software. Instructions or code forming the firmware or software are stored on a machine-readable medium. As described herein, DAA is a scheme that enables remote authentication of TPM, while preserving the privacy of the user of the platform that contains the TPM.

Herein, "machine-readable medium" may include, but is not limited to a floppy diskette, hard disk, optical disk (e.g., CD-ROMs, DVDs, mini-DVDs, etc.), magneto-optical disk, semiconductor memory such as read-only memory (ROM), random access memory (RAM), any type of programmable read-only memory (e.g., programmable read-only memory "PROM", erasable programmable read-only memories "EPROM", electrically erasable programmable read-only memories "EEPROM", or flash), magnetic or optical cards, or the like. It is contemplated that a signal itself and/or a communication link can be regarded as machine-readable medium since software may be temporarily stored as part of a downloaded signal or during propagation over the communication link.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, smart cards or other like form factor device including an integrated circuit, or other like device such as a bank card, credit card, identification card and the like including logic to perform enhanced revocation according to any one of the described embodiments. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "verifier" refers to any entity (e.g., person, platform, system, software, and/or device) that requests some verification of authenticity or authority from another entity. Normally, this is performed prior to disclosing or providing the requested information. A "prover" refers to any entity that has been requested to provide some proof of its authority, validity, and/or identity. An "issuer" defines a trusted membership group and engages with hardware devices to join the trusted membership group. A "device manufacturer," which may be used interchangeably with "certifying manufacturer," refers to any entity that manufactures or configures a platform or device (e.g., a Trusted Platform Module). An issuer may be a device/certifying manufacturer.

As used herein, to "prove" or "convince" a verifier that a prover has possession or knowledge of some cryptographic information (e.g., signature key, a private key, etc.) means that, based on the information and proof disclosed to the verifier, there is a high probability that the prover has the cryptographic information. To prove this to a verifier without "revealing" or "disclosing" the cryptographic information to the verifier means that, based on the information disclosed to the verifier, it would be computationally infeasible for the verifier to determine the cryptographic information. Such proofs are hereinafter referred to as direct proofs.

Throughout the description and illustration of the various embodiments discussed hereinafter, coefficients, variables, and other symbols (e.g., "h") are referred to by the same label or name. Therefore, where a symbol appears in different parts of an equation as well as different equations or functional description, the same symbol is being referenced.

FIG. 1 illustrates system 100 featuring a platform implemented with a trusted hardware device (referred to as "Trusted Platform Module" or "TPM") in accordance with one embodiment. A first platform 102 (Verifier) transmits an authentication request 106 to a second platform 200 (Prover) via network 120. In response to request 106, second platform 200 provides the authentication information 108. In one embodiment, network 120 forms part of a local or wide area network, and/or a conventional network infrastructure, such as a company's Intranet, the Internet, or other like network.

Additionally, for heightened security, first platform 102 may need to verify that prover platform 200 is manufactured by either a selected device manufacturer or a selected group of device manufacturers (hereinafter referred to as "device manufacturers"). In one embodiment, first platform 102 challenges second platform 200 to show that it has cryptographic information (e.g., a private member key) generated by an issuer 110. Second platform 200 replies to the challenge by providing authentication information, in the form of a reply, to convince first platform 102 that second platform 200 has cryptographic information generated by issuer 110, without revealing the cryptographic information or any unique, device/platform identification information referred to herein as "unique, device identification information" to enable a trusted member device to remain anonymous to the verifier. As indicated above, an issue may be a device certifying manufacturer.

Figure 2:
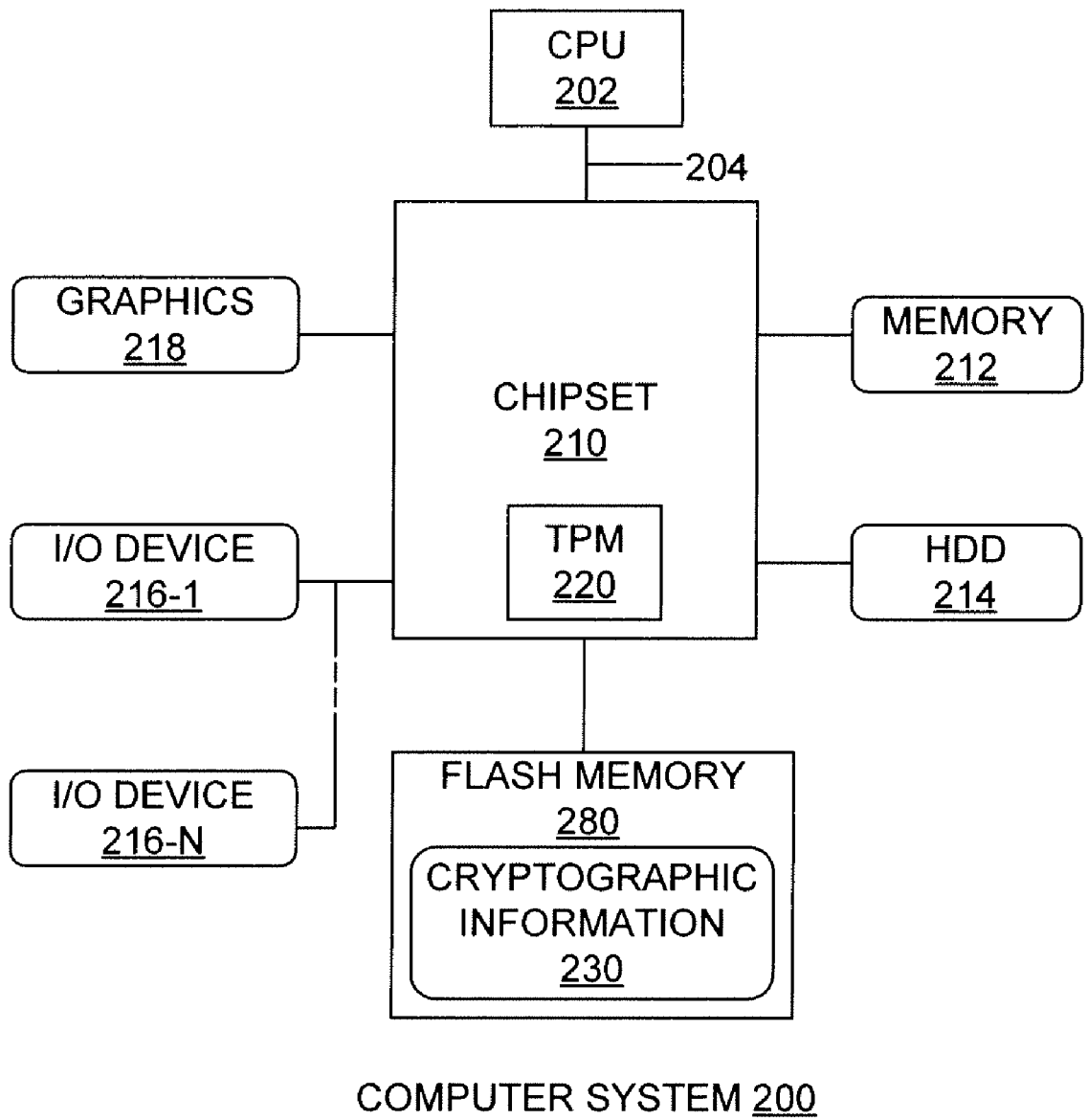
FIG. 2 illustrates a first embodiment of the platform including the TPM of FIG. 1.

FIG. 2 is a block diagram further illustrating anonymous platform 200 including TPM 220 to convince a verifier that platform 200 possesses uncompromised cryptographic information without disclosure of the cryptographic information or any unique device identification information. In one embodiment TPM 220 includes a unique group membership certificate and a private member key to provide a private signature. In one embodiment, TPM 220 in combination with platform 200 generates authentication information using private unique signature key 230 to prove to a verifier that platform 200 is a member of a trusted membership group defined by an issuer 110 (e.g., device manufacturer), without disclosure of any unique device identification information including the private signature key to enable trusted platform 200 to remain anonymous to verifier 102 (FIG. 1). As described herein, the cryptographic information may be alternatively referred to as a private member key/private signature key. Representatively, computer system 200 comprises a processor system bus (front side bus (FSB)) 204 for communicating information between processor (CPU) 202 and chipset 210. As described herein, the term "chipset" is used in a manner to collectively describe the various devices coupled to CPU 202 to perform desired system functionality.

Representatively, graphics block 218 hard drive devices (HDD) 214 and main memory 212 may be coupled to chipset 210. In one embodiment, chipset 210 is configured to include a memory controller and/or an input/output (I/O) controller to communicate with I/O devices 216 (216-1, . . . , 216-N). In an alternate embodiment, chipset 210 is or may be configured to incorporate graphics block 218 and operate as a graphics memory controller hub (GMCH). In one embodiment, main memory 212 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

Figure 3:
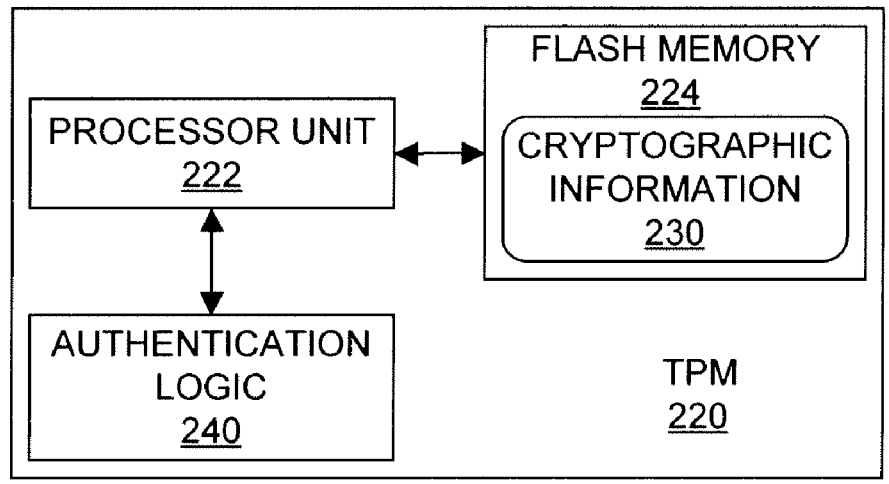
FIG. 3 illustrates a second embodiment of the platform including the TMP of FIG. 1.

FIG. 3 further illustrates Trusted Platform Module (TPM) 220 of second platform 200, in accordance with one embodiment. TPM 220 is a cryptographic device that is manufactured by a device manufacturer, such as an issuer 110. In one embodiment, TPM 220 comprises processor unit 222 with a small amount of on-chip memory encapsulated within a package. In one embodiment, the encapsulated memory may be used to store cryptographic key 230 received from a certifying manufacturer. In one embodiment, the encapsulated memory may be used to store a private unique membership key 230 generated during a join procedure with an issuer 110. TPM 220 is configured to provide authentication information to first platform 102 that would enable it to determine that the authentication information is transmitted from a valid TPM. The authentication information used is non-unique data that would make it highly likely that the TPM's or second platform's identify can be determined, referred to herein as "unique, device identification information."

In one embodiment, TMP 220 further comprises non-volatile memory 224 (e.g., flash) to permit storage of cryptographic information such as one or more of the following: keys, hash values, signatures, certificates, etc. In one embodiment, the cryptographic information is a cryptographic key received from a certifying manufacturer. As shown below, a hash value of "X" may be represented as "Hash(X)". Of course, it is contemplated that such information may be stored within external memory 280 of platform 200 in lieu of flash memory 224. The cryptographic information may be encrypted, especially if stored outside TPM 220.

In one embodiment, TPM 220 includes authentication logic 240 to respond to an authentication request from a verifier platform. In one embodiment, authentication logic 240 convinces or proves to the verifier platform that TPM 220 has stored cryptographic information generated by a certifying device manufacturer, without revealing the cryptographic information or any unique device/platform identification information. In one embodiment, authentication logic 240 computes a digital signature according to a received message using private signature/member key 230 to convince or prove to the verifier platform that TPM 220 has stored cryptographic information generated by an issuer of a trusted membership group, without revealing any unique device/platform identification information. As a result, authentication logic 240 performs the requested authentication while preserving the identity of the prover platform to maintain anonymity of platform 200. Authentication logic 240 is further illustrated with reference to FIG. 4.

In one embodiment, attestation logic 250 is configured to engage in an attestation protocol proof, as described in further detail below, to convince a verifier that the prover platform contains the cryptographic information from a certifying manufacturer without revealing the cryptographic information. As described below, key logic 270 performs platform set-up of TPM 220 to receive a unique, secret private pair $(c, F)$, where F is a private signature key, $F = c^e \mod n$, and e,n is a public key of a certifying manufacturer of TMP 220.

As described in further detail below, denial of group signature logic 260 provides additional functionality described below to convince or prove to a verifier platform that a private signature key held by the device was not used to generate any one of a group of suspect signatures, as performed by attestation logic 250. It is appreciated that a lesser or better equipped computer than described above may be desirable for certain implementations. Therefore, the configuration of platform 200 will vary from implementation to implementation depending upon numerous factors, such as price constraints, performance requirements, technological improvements, and/or other circumstances.

In one embodiment, each hardware device, which is a member of a platform group, is assigned a unique, private signature key. Representatively, a trusted hardware device, having an assigned private signature key, is able to sign a message received as part of an authentication request from a verifier. However, in contrast to a traditional digital signature system, verification of a digital signature created with a unique, private signature key of a member device is verified using a group public key for the platform group defined by the issuer. Accordingly, by using its private signature key, a member device of a platform group limits the disclosure of unique device identification information to an indication that the device is a member of a platform group of trusted hardware devices defined by a certifying manufacturer.

In one embodiment, authentication logic 240 enables one to prove that he is a member in good standing in a group without revealing any information about his identity. According to DAA, a member of a group has a credential ("group membership certificate") that is used to prove membership in the group. In one embodiment, the credentials consist of a private key and public key. The private key is unique for every different member of the group. However, the public key is the same for all members of the group.

As described herein, the issuer, such as issuer 110, is the entity that establishes that a person (or an entity) is a member of a group, and then issues a credential to the member. As further described herein, the prover is a person or entity that is trying to prove membership in the group. If the prover is indeed a member in the group and has a valid credential, the proof should be successful. As further described herein, the verifier is the entity that is trying to establish whether the prover is a member of the group or not. So the prover is tying to prove membership to the verifier.

Figure 4:
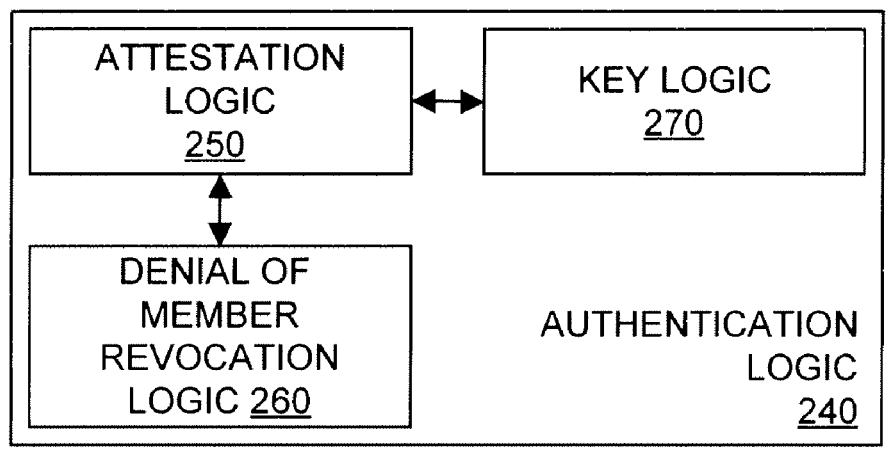
FIG. 4 illustrates an exemplary embodiment of a computer implemented with the TMP of FIG. 2.

As shown in FIG. 4, to prove membership, a verifier requests that the prover digitally sign some messages in, for example, digital signature logic 260. If the verifier needs to know that the message was signed at the current time, then the verifier would create a random value (a nonce) that is given to the prover to include in the signature. The prover signs the message using a private key and sends the signature to the verifier. As described herein, such signature is referred to as a group digital signature since it is verified with the published, group public key of the trusted membership group.

In one embodiment, verifier can verify the signature using the group public key and, if verification succeeds, the verifier knows that the prover is a member of the group. If the nonce was used, the verifier knows that the signature was created between the time he sent the nonce and the time the signature was received. Hence, the verifier does not learn which member created the digital signature.

In one embodiment, TPM 220 may be incorporated on a smart card, including a form factor of a PCMCIA card for insertion into a PCMCIA slot, or incorporated on an identification device such as a driver's license, identification card, credit card or other like configuration having the form fact of the standard driver's license/credit card and including an integrated circuit to perform one or more cryptographic procedures as described herein. However, it should be recognized that certain cryptographic functions may be computed by an attached host, such as platform 200. According to such a configuration, use of TPM 220 on, for example, a driver's license would enable conformance with the Real ID Act of 2005. The REAL ID Act of 2005 is Division B of an act of the United States Congress titled Emergency Supplemental Appropriations Act for Defense, the Global War on Terror, and Tsunami Relief, 2005, Pub. L. No. 109-13, 119 Stat. 231 (May 11, 2005).

The Real ID Act of 2005 creates a de facto national identification card. The Real ID Act is a law imposing federal technological standards and verification procedures on state driver's licenses and identification cards, many of which are beyond the current capacity of the federal government, and mandating state compliance by May 2008. One attempt to implement the Real ID Act on state driver's licenses generally exposes privacy sensitive information of the holder of the card. Unfortunately, such security information is often sold, without the owners consent, and used to conduct fraudulent transactions in the owner's name but without the owner's consent. Such activity is generally known as identity theft, which is a widespread phenomenon that is destroying the credit of innocent victims on a daily basis.

According to such a configuration, the Department of Motor Vehicle, or DMV, is the issuer and engages in a setup procedure to create a group public key and a group issuing private key. The issuer publishes the public key and keeps the group issuing private key private. According to such a procedure, for each issued driver's license, a general procedure is followed to provide a user private key from the issuer. In one embodiment, the encapsulated memory may be used to store a private unique membership key 230 generated during a join procedure with an issuer 110. Accordingly, the user private key together with the group public key is the user's credential for this group.

In one embodiment, methods are described for revoking credentials of a member. For example, if a member's private signature key gets removed from the storage device of the member, it is published widely so that a verifier knows that this compromised private signature key, then the verifier is able to check whether a particular signature was created using this compromised private signature key. In an alternative method, the verifier does not need to know the comprised member's private keys. Suppose the member had performed a proof of membership, and the verifier or some other entity determines that the prover in that case should be placed on the revocation list. Then, later in another transaction, after the prover has proven that she is a member of a group, the verifier can ask the prover to prove that she was not the revoked member who is the prover in that early case.

In accordance with such an embodiment, when TPM 220, as well as authentication logic, as shown in FIG. 4, is incorporated onto a card having a form factor of as a standard driver's license, credit card or other like smart card device for accessing bank machines or the like, a holder of the card can engage in a verification procedure to prove that the owner of the card is not a revoked member without requiring, for example, the issuer (DMV) to have a copy of the compromised private keys.

A "platform family" may be defined by the device manufacturer (issuer) as a trusted membership group that includes one or more types of platforms or devices. For instance, a platform family may be the set of all platforms (members) that have the same security relevant information. This security relevant information could contain some of the information that is included in the EK or AIK certificate in the TCPA model. It could also include the manufacturer and model number of the particular platform or device. For each platform family, a device manufacturer creates the cryptographic parameters that the manufacturer uses for that platform family. The device manufacturer creates a signature key that it uses to sign the secrets for the devices (e.g., platform 200 or TPM 220) that it manufactures as shown in FIGS. 5-6.

Figure 5:
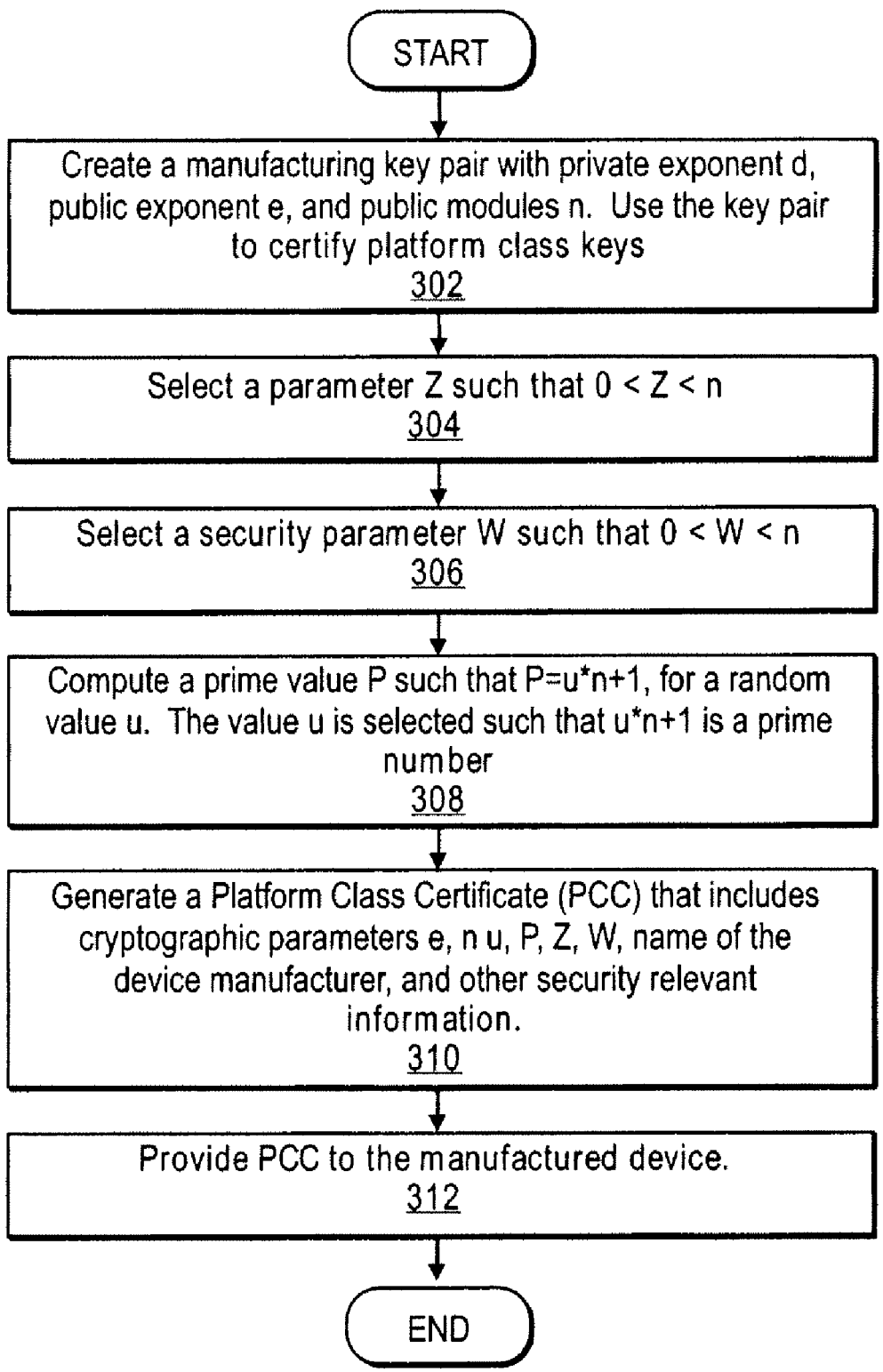
FIG. 5 illustrates a flow diagram of a procedure to setup a TPM during manufacturing according to one embodiment.
Figure 6:
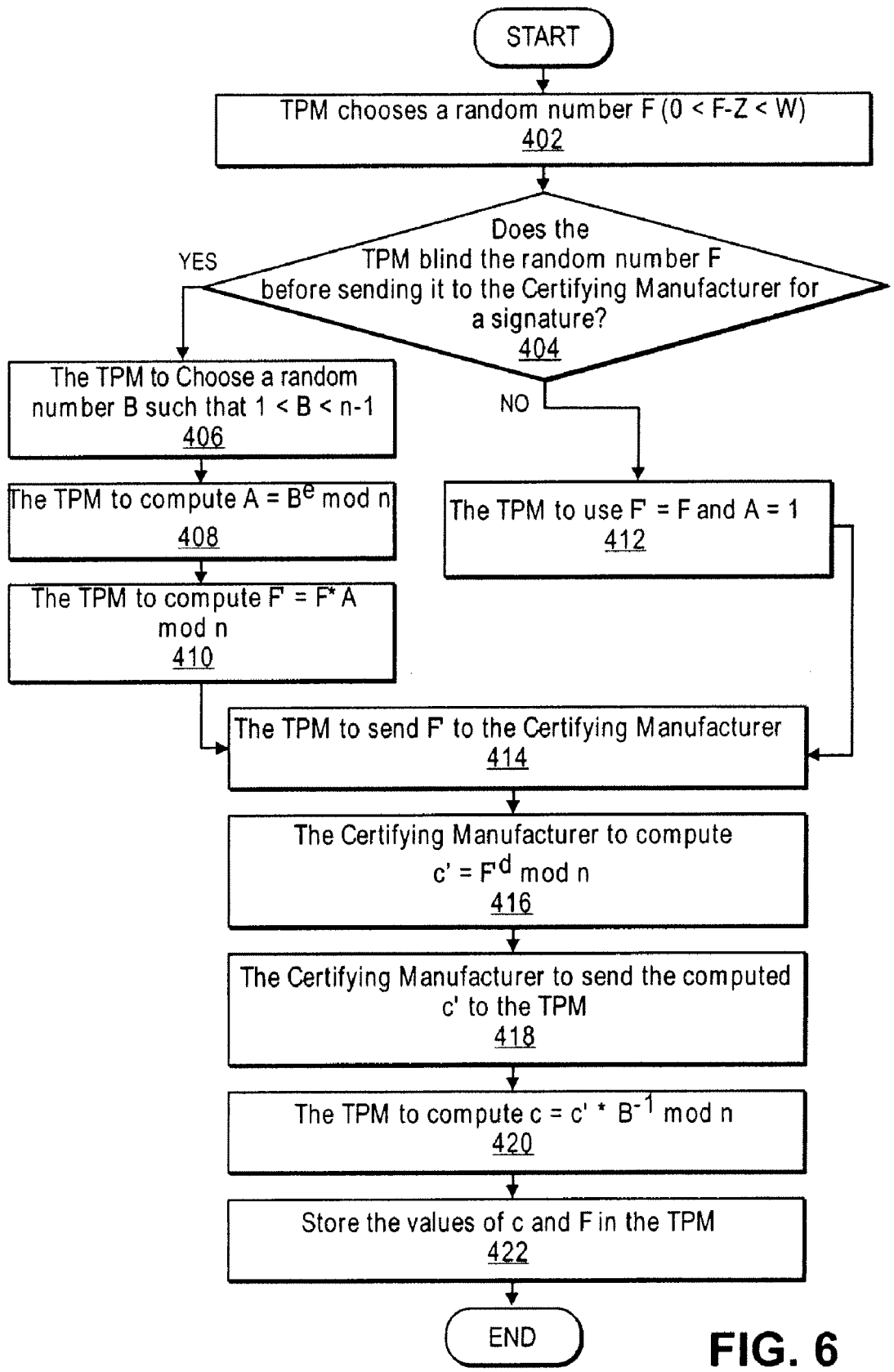
FIG. 6 illustrates a flow diagram of a procedure to setup each platform manufactured according to one embodiment.

FIG. 5 is a flowchart illustrating a method 400 to form a platform family certificate (PFC) (platform group membership certificate) in accordance with one embodiment. In one embodiment, the issuer (device manufacturer) uses a public key cryptographic function (e.g., Rivest, Shamir and Adelman (RSA) function) to create an RSA public/private key pair with public modulus n, public exponent e, and private exponent d (block 402). The public key is based on values e,n while the private key is based on d,n. This can be created using well known methods, such as those described in *Applied Cryptography*, by Bruce Schneier, John Wiley & Sons; ISBN: 0471117099; Second Edition (1996). In one embodiment, modulus n should be chosen large enough so that it is computationally infeasible to factor n.

The issuer specifies a parameter Z, which is an integer between zero (0) and n (block 404). The device manufacturer specifies a security parameter W, which is an integer between zero (0) and n (block 406). However, picking W too small or too large may introduce a security failure. In one embodiment of the invention, W is selected to be approximately $2^{160}$. Selecting W to be between $2^{80}$ and the square root of n is recommended. In one embodiment of the invention, the device manufacturer computes a prime number P, such that $P=u*n+1$ (block 408). Any value of u can be used as long as P is prime; however, to retain an acceptable level of security, the value P should be large enough so that computing a discrete logarithm "mod P" is computationally infeasible.

In one embodiment, the Direct Proof public key of the device manufacturer consists of the cryptographic parameters e,n,u,P,Z,W. These parameters will be used by a verifier to verify a direct proof signature created by a device. The device manufacturer generates a Platform Family Certificate that comprises cryptographic parameters e, n, u, P, Z, W, the security relevant information of the platform family, and the name of the device manufacturer (block 410). In one embodiment, the parameters u and P would not both be included since given n and one of these parameters, the other can be computed by P=u*n+1. In one embodiment, the device manufacturer uses the same cryptographic parameters e, n, u, P, W for several different platform families, and just varies the value Z for the different platforms. In this case, the values of Z may be chosen to differ by approximately or at least 4W, although the selected difference is a design choice.

Once the Platform Family Certificate is generated, the device manufacturer provides the Platform Family Certificate to the platforms or devices it manufactures which belong to that particular platform family (block 412). The distribution of cryptographic parameters associated with the Platform Family Certificate from a prover (e.g., second platform 200 in FIG. 1) to a verifier may be accomplished in a number of ways. However, these cryptographic parameters should be distributed to the verifier in such a way that the verifier is convinced that the Platform Family Certificate was generated by the device manufacturer.

For instance, one accepted method is by distributing the parameters directly to the verifier. Another accepted method is by distributing the Platform Family Certificate signed by a certifying authority, being the device manufacturer as one example. In this latter method, the public key of the certifying authority should be distributed to the verifier, and the signed Platform Family Certificate can be given to each platform member in the platform family (prover platform). The prover platform can then provide the signed Platform Family Certificate to the verifier.

FIG. 6 is a flowchart illustrating a method 500 for the setup performed for a prover platform manufactured according to one embodiment, such as, for example, by key logic 270, as shown in FIG. 4. The TPM of the prover platform chooses a random number F such that 0<F−Z<W (block 502). The TPM may blind this random number F before sending it to the certifying manufacturer for signature (block 504). This blinding operation is performed to obfuscate the exact contents of the random number F from the certifying manufacturer. In one embodiment, the TPM chooses a random value, B, where 1<B<n−1 (block 506), and computes $A=B^e$ mod n (block 508). Then, the TPM computes F'=F*A mod n (block 510). If the TPM does not blind F, then the TPM uses F'=F and A=1 (block 512).

After performing these computations, TPM sends F' to the certifying manufacturer (block 514). The certifying manufacturer computes $c'=F'^d$ mod n (block 516), and provides c' to the prover (block 518). The TPM of the prover computes $c=c'*B^{-1}$ mod n (block 520). Notice that this implies that $c=F^d$ mod n. The values c and F are then stored in the TPM or external storage within the prover (block 522). As described herein, F is referred to as a signature key of the TPM, whereas the secret pair c,F are referred to as cryptographic information and may also be referred to herein as a "member key". As described herein, F may be referred to as the "pseudonym exponent".

As described herein, Direct Proof (DP) is a method for proving to a verifier that a cryptographic key is held in hardware without revealing information about the identity of the hardware device. In a DP system, an issuer creates a public/private key pair. The issuer uses his private key to create and issue member private keys to members. The DP was created for the application in which the members are hardware devices. Each member goes through a JOIN process with the issuer to receive a member key. With a member key, a member can sign a message.

Similarly, a verifier can verify that the signature is valid using the issuer's public key. This is the important distinction between DP and a traditional public/private key signature scheme. In the traditional scheme, a user's signature is validated using the user's public key. Thus in order to validate a signature, the user's public key must be revealed. The public key is unique to the individual and thus identifies the user. In the DP scheme, the member's signature is validated using the issuer's public key. Thus all members can have their signatures validated using the same public key. It can be proven that a signature created by a member does not identify which member created the signature.

Operation of the TPM to perform a direct proof to convince a verifier that the hardware device possesses cryptographic information from a certifying manufacturer is described within co-pending U.S. application Ser. No. 10/675,165, filed Sep. 30, 2003. In the Direct Proof scheme, the prover's signature used in a direct proof ("direct proof signature") is validated using a public key if the platform manufacturer (issuer). Thus all members can have their signatures validated using the same public key. It can be proven that a direct proof signature created by a member does not identify which member created the direct proof signature.

To prove to a verifier that the TPM contains a unique secret pair, the TPM may obtain a value for B to use as a base according to the random base option. For example, the TPM may compute $k=B^F$ mod N and give B,k to the verifier in response to a signature request. Accordingly, as described herein, the value k is referred to as the "pseudonym" for the direct proof signature and B is referred to as the "base" for the direct proof signature. The TPM then constructs a direct proof signature, which is a proof that the TPM possesses F,c, such that $F=c^e$ mod n and $k=B^F$ mod P, without revealing any additional information about F and c. A method for constructing a direct proof signature is given in co-pending U.S. application Ser. No. 10/306,336, which is also owned by the assignee of the present application. TPM may use different B values each time the TPM creates a new direct proof signature so that the verifiers may not know that they received the proof from the same TPM according to the random base option.

Referring again to FIG. 4, in one embodiment, TPM 220 includes denial of signature logic 260 to handle revocation of member keys. The member keys are held in hardware, but it is possible that the keys can be removed. In this case, verifiers would revoke any removed key and quit accepting direct proof signatures generated with a revoked (unknown suspect) key. As a part of the signature process, the member selects a random base B and a public key (e,n) of a certifying member to compute $k=B^F$ mod P. The values of B and k are revealed as part of the signature. It is proven that if random bases are used, then given two different signatures, it is computationally infeasible to determine whether the two signatures were created with the same pseudonym exponent, F or different pseudonym exponents, F's.

However, if adversaries have removed the secret pseudonym exponents F's from some number of hardware devices, (say F1, F2, F3) and if a verifier has these pseudonym exponents, then the verifier can tell if a given signature was created using one of these pseudonym exponents, by checking whether $K=B^{F1}$ mod P or $B^{F2}$ mod P or $B^{F3}$ mod P. This works for the case where the verifier has the secret F's that were removed from the hardware device. But it does not work in the case where the verifier suspects that a member key has been removed from a hardware device, but he does not have the member key, specifically the exponent F.

To give the verifier the ability to revoke a member key that he suspects is compromised, the Direct Proof methods support the named base option. In one embodiment, according to the named base option, the verifier would provide the base B, which in one embodiment, is derived from the name of the verifier. The member would use this base B in the Direct Proof signature instead of picking a random B. As long as the verifier was using the same base, the verifier could tell if two signatures sent to him used the same pseudonym exponent, F, because the two signatures would produce the same pseudonym, $B^F$ mod P.

Thus if a verifier, using the named base option, received a direct proof signature, and suspected that the member key used to create that signature had been compromised, the verifier would be able to reject further signatures by this member key as long as he was using the same named base. However, the only way for a verifier to make effective use of the named base option is to use the same named base for a long time. This is not ideal from a privacy perspective, since it enables a verifier to link all of the transactions performed by a member with the verifier's named base.

Direct Anonymous Attestation (DAA) is a scheme that enables remote authentication of TPM, while preserving the privacy of the user of the platform that contains the TPM. The concept of DAA is very similar to Direct Proof. In the embodiments described, the method and apparatus for enhanced revocation is compatible with both direct proof and direct anonymous attestation, as described. A recent disclosure showed that DAA could be modified so that the computations could be done using elliptic curves rather than modular exponentiation described within co-pending U.S. application Ser. No. 11/778,804, entitled "An Apparatus and Method for Direct Anonymous Attestation From Bilinear Maps," filed on Jul. 17, 2007. In the embodiments described, the method and apparatus for enhanced revocation is compatible with the direct anonymous attestation using elliptic curves also. In this latter case, the pseudonym is $K=B^F$ where the computation is over the elliptic curve group instead of modular multiplication (i.e., using the same notation as that described within co-pending U.S. application Ser. No. 11/778,804.)

Figure 7:
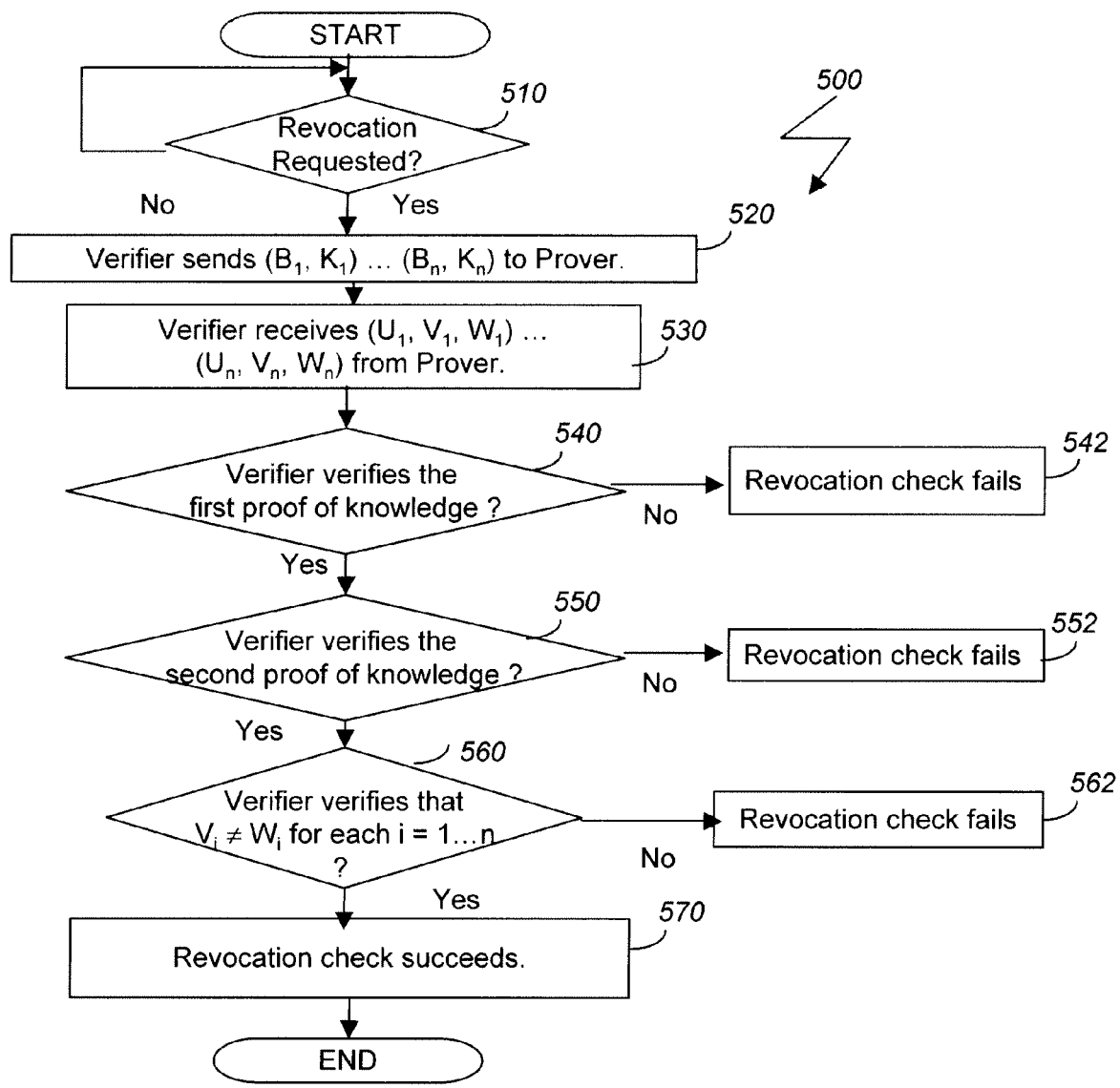
FIG. 7 is a flowchart illustrating a method for verifying that a cryptographic key stored within a trusted hardware device is uncompromised, in accordance with one embodiment.
Figure 8:
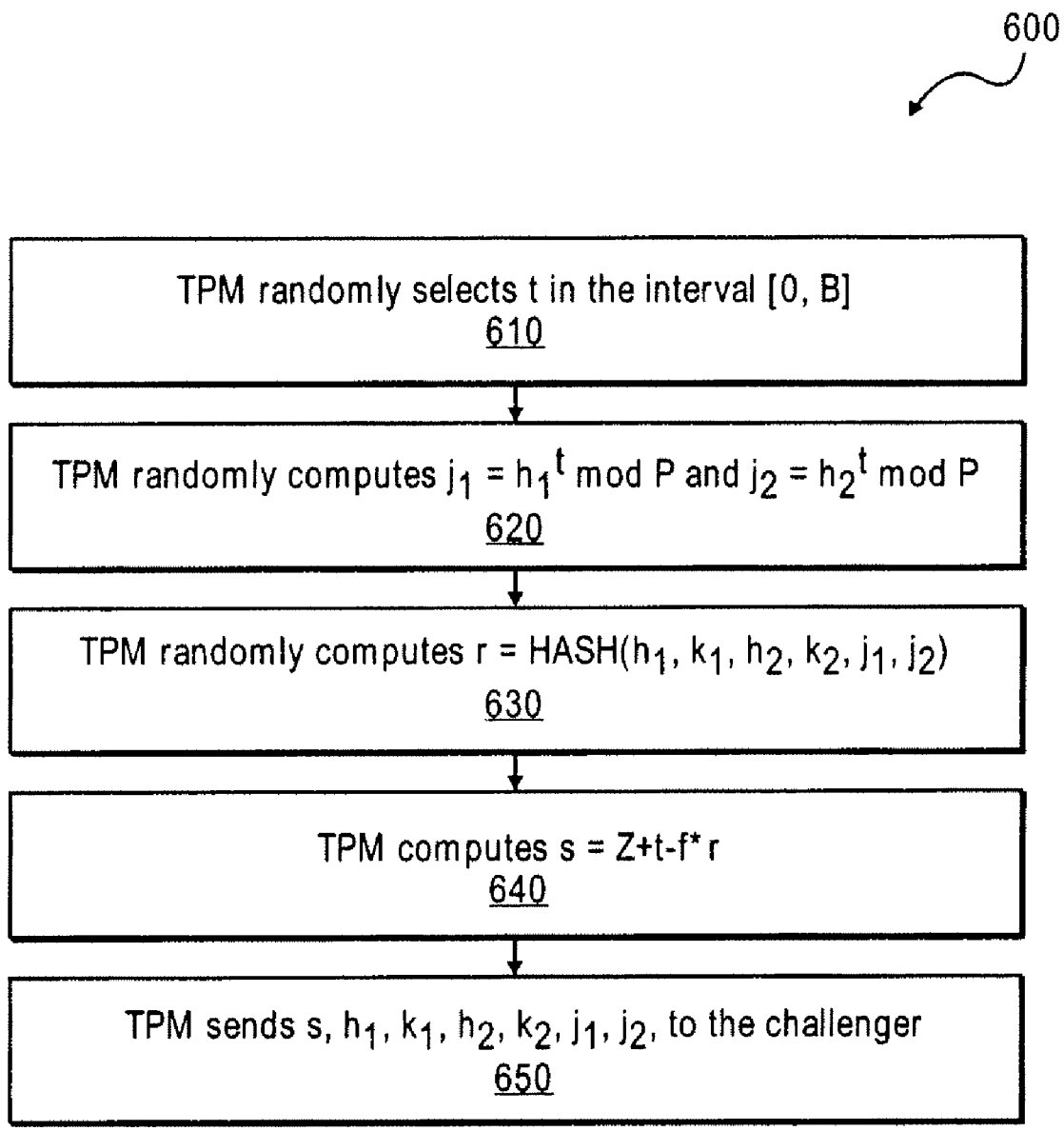
FIG. 8 is a flowchart illustrating a method for a zero knowledge proof to show that two discrete logarithms are the same, in accordance with one embodiment.

In one embodiment, an efficient revocation method of suspect member keys in the random base option that applies to DP, DAA, and other like anonymous attestation protocols is described. As shown in FIGS. 7 and 8, suppose a verifier using the random base option received several DP or DAA signatures and then decided that the corresponding member keys that had created the signatures were compromised. Thus the verifier would request that a member (prover) prove that the member key he used to create his signature was not one of the keys used to create the signatures on the verifiers list.

In one embodiment, the verifier can effectively reject any future signatures that are created using that same member keys within a single protocol. In the previous revocation method, the verifier has to run the revocation check protocol multiple times, once for each compromised DP or DAA signature. As a result, one embodiment of the described invention is substantially faster than the previous scheme. The amount of computation performed for each item on the verifier's compromised list is reduced by 25%.

For each signature produced in DP or DAA, a prover reveals a pseudonym $K=B^F$ mod P, for a base B, a secret F that is unique to the member, and a modulus P that is common to many provers. In the random base option, the prover chooses the base B at random. In the named base option, the verifier provides a name, and B is determined from that name. In this invention, we assume that the random base option is being used.

Figure 10:
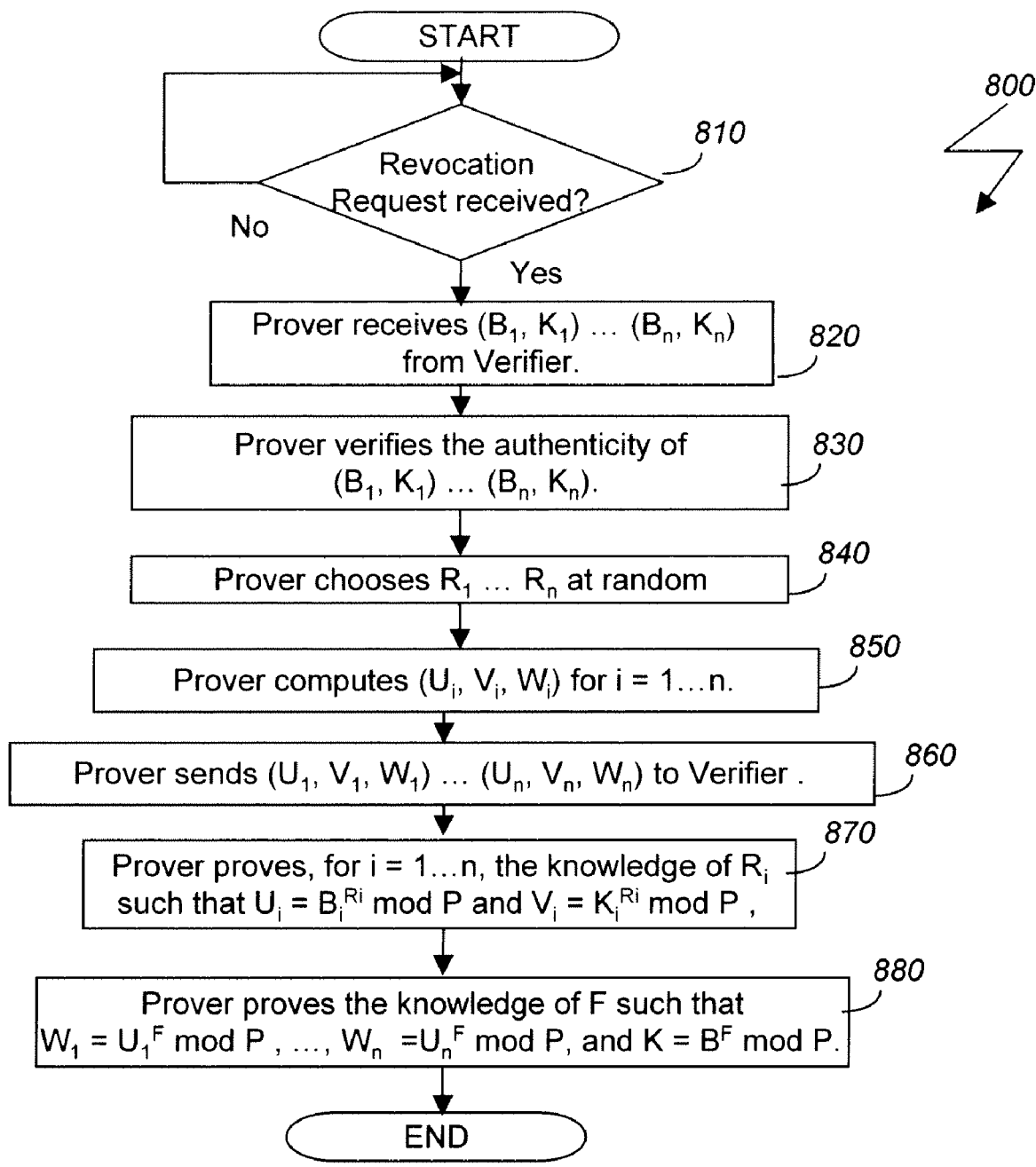
FIG. 10 is a flowchart illustrating a method for convincing a verifier that a cryptographic key stored within a trusted hardware device is uncompromised, in accordance with one embodiment.

Suppose that a verifier received base and pseudonym pairs $(B_1, K_1) \ldots (B_n, K_n)$ in DP or DAA and then suspects that the secrets $F_1 \ldots F_n$, that were used in DP or DAA signatures have been compromised. The verifier would then perform the following protocol to reject any future signatures generated by the secret $F_1 \ldots F_n$, as shown in FIGS. 7 and 10, which may be referred to herein as a proof of membership protocol.

FIG. 7 is a flowchart illustrating a method 500 performed by a verifier platform in order to verify that a cryptographic key stored within a TPM is uncompromised, in accordance with one embodiment. Representatively, at process block 510, the verifier platform determines whether it is aware of a group of suspect signatures generated with unknown suspect keys. Suppose that the verifier platform is aware of some suspect direct proof signatures, generated with unknown suspect keys. Let $B_1$-$B_n$ be the bases and $K_1$-$K_n$ be the pseudonyms that were received with one of the suspect signatures. In one embodiment, the verifier platform performs the process described below for the suspect signatures.

In one embodiment, the protocol initiated in response to an authentication request issued from the verifier to a prover may be referred to herein as a proof of membership protocol run by a prover and a verifier. This membership protocol may contain a request phase, a challenge phase, a sign phase, and a verify phase. In the request phase, a prover initializes the interaction with the verifier by sending a request to the verifier. In one embodiment, the group of suspect signatures includes components which are placed on a revocation list. In one embodiment, a revocation server 120 (See FIG. 1) regularly publishes the newest revocation lists.

As indicated above, one type of verification is private key based revocation such that a private key revocation list would include private keys $\{F_1, \ldots, F_n\}$ to denote the revocation list. For private key based revocation, each private member key is a revocation token extracted from a compromised user's private key and "n" is the total number of tokens in the revocation list. In one embodiment, this revocation list may include components of revoked signatures $(B_1, K_1) \ldots (B_n, K_n)$ to denote the revocation lists for the signature based verification for each $(B_i, K_i)$ as a revocation token extracted from a suspect user signature and "n" as the total number of tokens in the signature based revocation list. In one embodiment, it is the responsibility of the verifier platform 102 to obtain the latest revocation list from the revocation server 120, for example, as shown in FIG. 1.

In the embodiments described, the verifier platform does not contain a copy of the suspect keys $F_1$-$F_n$ used to compute the suspect signatures. Once the member provides a base B, a pseudonym K, and a DP or DAA signature for this pair, at process block 520, verifier platform transmits a revocation list including a plurality of revoked to tokens to the prover. For example, the revocation tokens may include bases and pseudonyms $(B_1, K_1) \ldots (B_n, K_n)$ of the group of suspect signatures, generated with the unknown, suspect keys $F_1$-$F_n$, where F is secret, member key held by the prover platform. In one embodiment, the verifier platform will receive one or more values from prover platform, computed using the bases and pseudonyms $(B_1, K_1) \ldots (B_n, K_n)$ at process block 530.

In one embodiment, validation of the non-revocation of the membership of the prover within the trusted membership group within prover platform is performed as illustrated with reference to process blocks 540-570. The prover platform will generate random values $R_1$-$R_n$. In one embodiment, the random values are chosen in some specified interval. At process block 540, verifier platform receives the values ($U_1$, $V_1$, $W_1$) ... ($U_n$, $V_n$, $W_n$) and a proof from prover platform that for i=1 ... n there exists a value $R_i$ such that:

$$U_i = B_i^{Ri} \bmod P \text{ and } V_i = K_i^{Ri} \bmod P. \qquad (1)$$

In one embodiment, the proof received by the verifier is in the form of a signature of knowledge that a private member key f computed during a join procedure with an issuer of the trusted membership group is uncompromised and securely stored within a trusted platform module or TPM of the prover platform. However, as described in further detail below, in response to a challenge request issued from a verifier, as a preliminary matter the prover platform first verifies that membership of the prover platform has not been revoked according to the revocation tokens contained within the revocation list received with the authentication request from the verifier. In one embodiment, when a prover platform determines that a private member key of the prover platform was used to generate a suspect signature according to revocation tokens contained within the revocation list, the prover platform aborts the proof of membership protocol, for example as shown in FIGS. 7 and 10.

As described herein, a first proof of knowledge is performed by the prover platform to illustrate that membership of the prover platform within a trusted membership group has not been revoked. As indicated above, when the prover platform determines that its membership within a trusted membership group is revoked, the prover platform aborts the membership protocol as shown in FIGS. 7 and 10. Otherwise, following completion of the first proof of knowledge, the prover platform will perform a second proof of knowledge that the private member key of the prover platform has not been revoked.

In one embodiment, the received proof of the existence of the value $R_i$ is in the form of a zero knowledge proof. One embodiment of such a zero knowledge proof for proving that two pairs ($U_i$, $B_i$) and ($V_i$, $K_i$) have the same discrete logarithm is given in FIGS. 8 and 9. Otherwise, the revocation check fails at process block 542. At process block 550, a verifier platform verifies a second proof of knowledge and receives a proof that there exists a value F such that:

$$W_1 = U_1^F \bmod P, \ldots W_n = U_n^F \bmod P \text{ and } K = B^F \bmod P. \qquad (2)$$

Again, the proof of the existence of the value F may be performed using a zero knowledge proof. One embodiment of such a zero knowledge proof for proving that two pairs ($W_1$, $U_1$) and (K,B) have the same discrete logarithm is given in FIGS. 8 and 9. Otherwise, the revocation check fails at process block 552.

Accordingly, once verifier platform is convinced of the existence of values $R_1$ ... $R_n$ and F, in one embodiment, at process block 560 verifier platform checks the values of $V_i$ and $K_i$. If $V_i = W_i \bmod P$ for 1 ... n, then the verifier knows that prover platform key, F, is equal to an unknown, suspect key, $F_1$ ... $F_n$ and revocation fails at process block 562. If:

$$V_i \neq W_i \bmod P \text{ for } 1 \ldots n \qquad (3)$$

then the verifier knows that prover platform key, F, is not equal to any of the unknown, suspect keys, $F_1$ ... $F_n$. The reason that the verifier is convinced that F is not equal to any of $F_1$ ... $F_n$ is the following. Suppose that $F = F_i \bmod (P-1)$ for some i. Then $V_i = K_i^{Ri} = B_i^{Ri\,Fi} = B_i^{Ri\,F} \bmod P$. But we also have that $W_i = U_i^F = B_i^{Ri\,F} \bmod P$. Thus $V_i = W_i \bmod P$. Thus $V_i = W_i \bmod P$ if and only if $F = F_i \bmod P$.

If $V_i \neq W_i \bmod P$, prover platform key F is not equal to any of the unknown, suspect keys $F_1$ ... $F_n$. Accordingly, at process block 570, the verifier receives a denial that the prover signature key F was used to generate any one of the suspect signatures, referred to herein as "proving the denial of a suspect signature". Hence, the revocation check succeeds at process block 570. Otherwise, $V_i = W_i \bmod P$, and the verifier platform receives confirmation that the prover platform was indeed using a compromised key $F_i$ for the signature.

In one embodiment, the prover platform denies the signature key F of the prover was used to form a suspect signature by using a standard zero knowledge proof. As described herein, the standard zero knowledge proof for proving that two pairs have the same discrete logarithm is provided as follows. Specifically, given a set of integers $k_1$, $h_1$, $k_2$, $h_2$, and a modulus P, the zero knowledge proof will prove that there exists an f such that $k_1 = h_1^f \bmod P$ and $k_2 = h_2^f \bmod P$ without revealing any information about f.

In one embodiment of a zero knowledge proof to show that two discrete logarithms are the same was given in co-pending U.S. application Ser. No. 10/306,336, which is also owned by the assignee of the present application. FIG. 8 is a flow diagram 600 illustrating this zero knowledge proof. Suppose that f is in the interval between Z and Z+W. (Z could be 0, as in the case of equation 1 above.) Let $B = W * 2^{Sp+HASH\_Length}$, where Sp is a security parameter and HASH_length is the length in bits of the output of the Hash function HASH. In one embodiment Sp is chosen large enough, for example Sp=60, so that the values of s computed below do not reveal useful information about f.

At process block 610, TPM randomly selects value t in the interval [0, B]. TPM may then compute $j_1 = h_1^t \bmod P$ and $j_2 = h_2^t \bmod P$ at process block 620. TPM may then compute $r = HASH(h_1, k_1, h_2, k_2, j_1, j_2)$ at process block 630. At process block 640, TPM may compute $s = Z + t - f*r$. Finally, at process block 650, TPM may send s, $h_1$, $k_1$, $h_2$, $k_2$, $j_1$, $j_2$ to the verifier. According to one embodiment, the verifier may then verify the proof.

Figure 9:
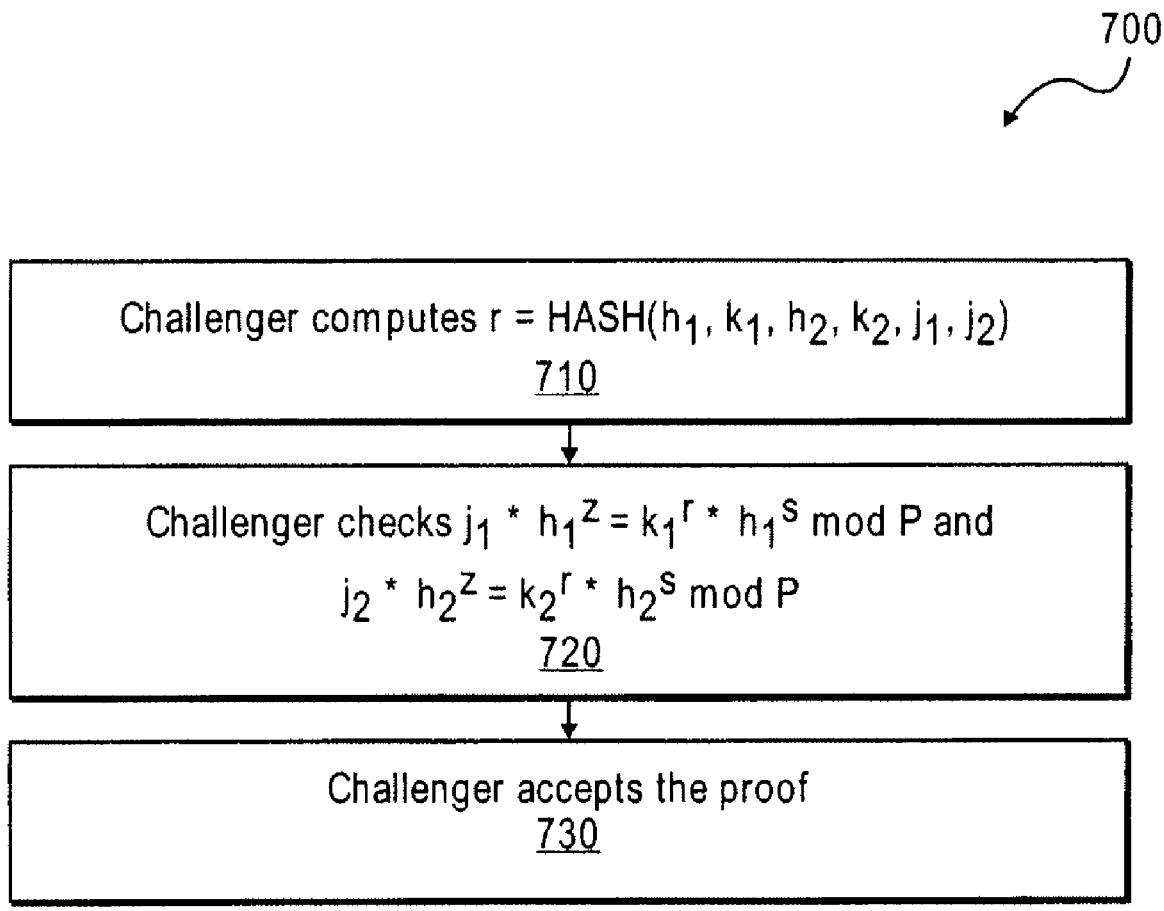
FIG. 9 is a flowchart illustrating a method for conceptually illustrating the verification of a proof that two discrete logarithms are the same, in accordance with one embodiment.

FIG. 9 is a flow diagram 700 conceptually illustrating the verification of a proof that two discrete logarithms are the same, according to one embodiment. At process block 710, the challenger may compute $r = HASH(h_1, k_1, h_2, k_2, j_1, j_2)$. The challenger may then check that $j_1 * h_1^z = k_1^r * h_1^s \bmod P$ and $j_2 * h_2^z = k_2^r * h_2^s \bmod P$ at process block 720. If the checks of process block 720 pass, the challenger may accept the proof at process block 730.

FIG. 10 is a flowchart illustrating a method 800 performed by a prover platform in response to receipt of a revocation request. As described herein, a verifier platform, once convinced of the existence of a cryptographic key stored within hardware device, may verify that the stored cryptographic key is uncompromised. In accordance with one embodiment, such functionality is provided by denial of group signature logic 260 of authentication logic 240 of TPM 220, as illustrated with references to FIGS. 2 and 3. Representatively, at process block 810, prover platform determines whether a revocation request is received. Once received, the functionality of process blocks 820-880 is performed.

In one embodiment, the method shown in FIG. 10 may be performed in response to a received challenge request from a verifier, which may include a message, a random value (nonce) and a revocation list including revocation tokens. Based on the revocation list, the prover platform initially verifies that membership of the prover platform within a trusted membership group established by an issuer has not been revoked. In one embodiment, a revocation server maintains both revoked keys as well as components of revoked signatures such as pseudonyms and base values generated as part of a digital signature from a previous trusted member device that has had its membership revoked.

In the embodiments described, a prover platform will perform a first signature of knowledge that membership of the prover platform has not been revoked. In one embodiment, this is performed by illustrating to the verifier platform that the private member key f was not used to generate digital signature components or revocation tokens within the received revocation list. As further shown in FIG. 10, a prover platform may generate a second proof of knowledge to illustrate that the prover platform possesses a secret private member key that was generated during a join procedure with an issuer of a trusted membership group, where the private member key is unknown to the issuer and a digital signature generated with the private member key is verified according to a public key of the trusted membership group.

Referring again to FIG. 10 at process block 820, verifier platform receives bases and pseudonyms $(B_1, K_1) \ldots (B_n, K_n)$ of a group of suspect signatures received in an attestation protocol for unknown, suspect keys $F_1 \ldots F_n$. At process block 830, the verifier gives $(B_1, K_1) \ldots (Bn, Kn)$ to the prover platform. Let F be the secret held by this member. At process block 830, the prover platform first verifies the authenticity of the pseudonym pairs (i.e., checks whether they are signed by a trusted revocation server), then selects $R_1 \ldots R_n$ at random at process block 840. At process block 850, the prover platform then computes for i=1 ... n: $U_i = B_i^{Ri} \mod P$, $V_i = K_i^{Ri} \mod P$, $W_i = U_i^F \mod P$. At process block 860, the prover platform sends $(U_1, V_1, W_1) \ldots (U_n, V_n, W_n)$ to the verifier. At process block 870, for i=1 ... n, the prover platform proves to the verifier that there exists $R_i$ such that $U_i = B_i^{Ri} \mod P$ and $V_i = K_i^{Ri} \mod P$. This is done using the standard zero knowledge proof, as described above (see FIGS. 8 and 9.)

At process block 880, the member proves to the verifier that there exists F such that $$W_1 = U_1^F \mod P, \ldots, W_n = U_n^F \mod P, \text{ and } K = B^F \mod P. \quad (4)$$

As indicated above, in one embodiment, the proofs are performed according to the zero knowledge proof as described in FIGS. 8 and 9. As also indicated above, assuming that Equation (4) evaluates to true, prover key F is not equal to unknown, suspect keys $F_1 \ldots F_n$. Hence, the prover denies that any of the suspect signatures were generated with a signature key F of the prover platform. Otherwise, if Equation (4) evaluates to false, prover key F is equal to one of unknown, suspect keys $F_1 \ldots F_n$. As a result, the prover platform would fail to prove denial of the group of suspect signatures. Accordingly, verifier platform would fail to authenticate prover platform, since prover platform is using a compromised key.

Accordingly, one embodiment provides enhanced security capabilities to the named based option described above. However, in one embodiment, a verifier platform is prohibited from submitting to prover platforms all signatures previously received. Namely, by submitting all previously received signatures to a prover platform, a prover platform that had previously submitted a signature would be required to identify the respective signature. As a result, the verifier platform would be able to link all previous signatures from the prover platform together. In one embodiment, several methods are provided to prevent abuse of the revocation capability described by one or more embodiments herein.

In one embodiment, a prover platform is provided with a built-in capability to limit the number of signatures that the verifier can present for denial. This is a reasonable method since a very small percentage of devices will be compromised and have their keys removed. However, if more than the limit get compromised, in one embodiment, devices may be rekeyed. A device would be rekeyed only after the device had proven that it was not a compromised device. Another method is to put into the device one or more public keys (hashes of public keys) of revocation authorities (revocation servers). Accordingly, a verifier platform would give a denial of signature if the request for denial was approved by one of these revocation authorities. The approval could be indicated by having the revocation server sign the request for denial, specifically to sign the pair $(B_0, K_0)$, or to sign a list of $(B_i, K_i)$ for all of the items on the revocation list. In one embodiment, the verifier may be required to prove authorization before supplying a signed revocation list.

In applying this method to a driver's license, there may be different revocation authorities, and different authorizations for different types of verifiers. A bar or restaurant that serves alcoholic beverages may use a list that includes only licenses for which the key has been reported compromised, or the license is reported lost, or for which an error has been found with the registration process. This revocation list would be signed by a revocation authority, and may not need any authorization to use this revocation list. An officer checking the license for validity at an airport may have a revocation list that includes in addition licenses that belong to people who are wanted for apprehension by law enforcement. The use of this list may need authorization. Thus when the airport officer submits the list to the license, the officer would need to authenticate to the license that he had the authority to that revocation list. A highway patrol officer may have a list that includes in addition the list of people with a revoked or suspended drivers license. The use of this list would also need authorization. So the highway patrol officer would also need to authenticate to the license that he had the authority to use that list.

One method for providing the authorization of an officer to use a particular revocation list is as follows. The license contains one or more keys for checking the validity of a revocation list. The license contains one or more "root keys for authorization" for checking the authorization for someone making a request for the license to prove that it is not on a particular revocation list. Every law enforcement officer that needed to check for additional revocations would have a public/private key pair, with the public key in a certificate issued within the certificate hierarchy of the root key for authorization. The law enforcement officer certificate would indicate what revocation lists he was allowed to use. For example, the list that the bar would use may have an indication that the list did not need authorization. A list that is used at an airport may indicate that it could be used by any individual with the authority to check whether the individual was wanted by law enforcement.

Correspondingly, any officer at the airport would have a certificate stating that they were authorized to submit a list which contained individuals wanted by law enforcement. When the license was given a list of individuals wanted by law enforcement, the license would check that the individual making the request had a certificate validated through the root key for authorization that authorized them to submit that list. Similarly, the highway patrol officer would have a certificate that granted him the authority to submit lists that contained licenses for which the driving privilege had been revoked or suspended. This concept can clearly be extended to include other types of revocation lists and authorities.

Figure 11:
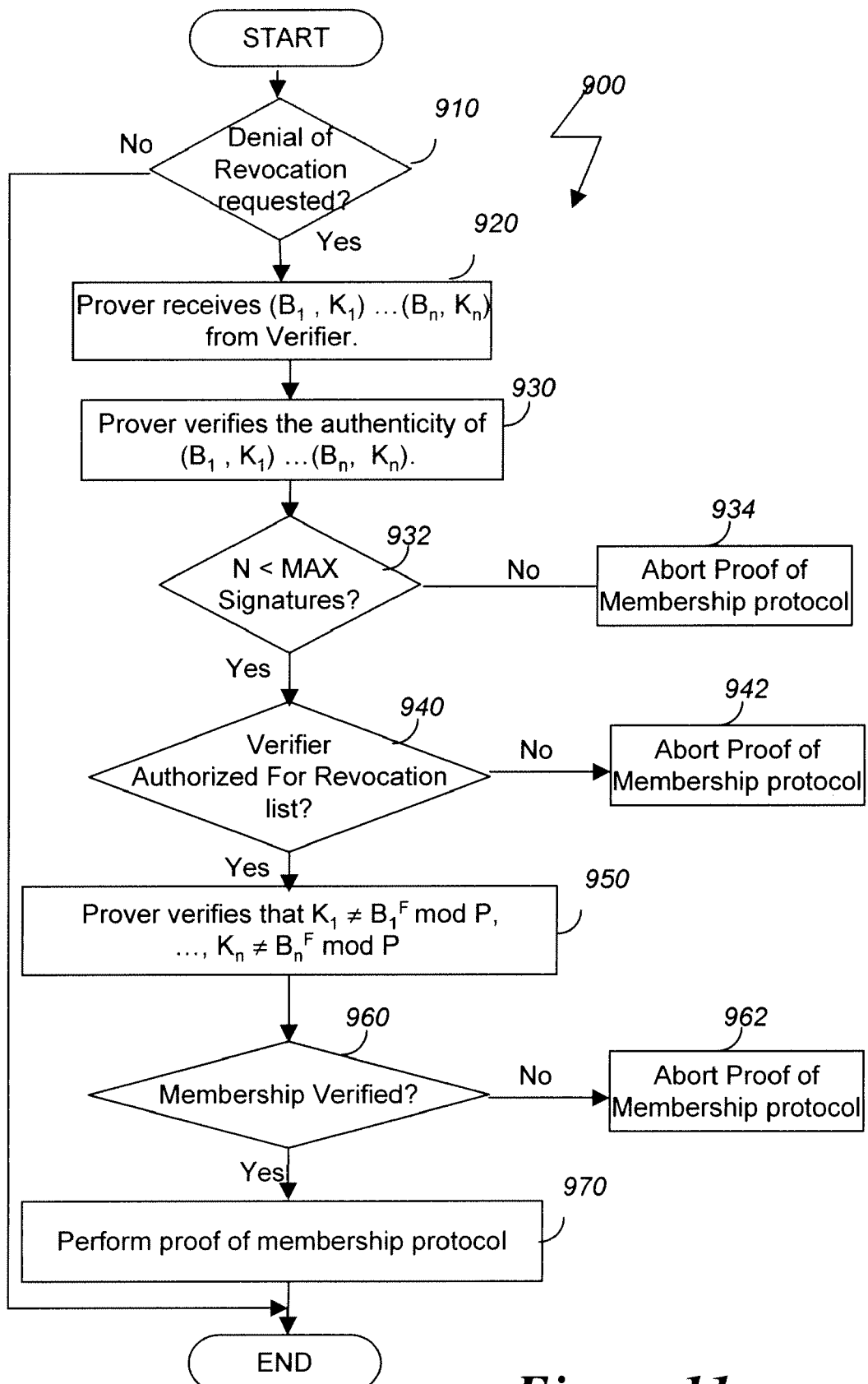
FIG. 11 is a flowchart illustrating a method for convincing a verifier that membership of an owner of a trusted hardware device within a trusted membership group is not revoked, in accordance with one embodiment.

FIG. 11 is a flowchart illustrating a method 900 to allow a trusted member device to prove the denial of membership revocation according to one embodiment. Representatively, at process block 910, it is determined whether a revocation request is received. Once received at process block 920, the prover receives a revocation list from the verifier including revocation tokens such as, for example, base and pseudonyms $(B_1, K_1) \ldots (B_n, K_n)$. Let F be the secret held by this member. At process block 930, the device first verifies the authenticity of the pseudonyms (i.e., checks whether they are signed by a trusted revocation server or by the issuer). At process block 932, the device verifies that the number of revocation tokens is less than a maximum signature's value. If the number of revocation tokens exceeds the maximum signature value, the proof of membership protocol is aborted at process block 934. Similarly, at process block 940, the device may verify that the verifier is authorized to issue the revocation list. In one embodiment, this may be performed according to a public key and a certificate issued with a certificate hierarchy of a root key for authorization held by a trusted member device. Assuming the verifiers authorize the issue of revocation list, control full branches to process block 950 otherwise the proof of membership protocol is aborted at process block 952.

Referring again to FIG. 11, at process block 950, the device then verifies that it has not been revoked in $(B_1, K_1) \ldots (B_n, K_n)$ by verifying $K_1 \neq B_1^F$ mod P, $\ldots$, $K_n \neq B_n^F$ mod P. If the above verifications pass, at process block 950 the device performs the proof of membership protocol, a DP or DAA signature, and a signature of knowledge that it was not the creator of these $(B_1, K_1) \ldots (B_n, K_n)$ pairs of the revocation list.

As shown in FIG. 11, the device is able to perform a proof of membership protocol only if it does not contain the secrets $F_1 \ldots F_n$. Conversely, if the device indeed contained one of the secrets $F_1 \ldots F_n$ and was thus the creator of one of the pseudonym pair $(B_i, K_i)$, then the device would abort the proof of membership protocol block 962 of FIG. 11.

In one embodiment, the platform has an auditing capability on the revocation lists that it has been given. The platform would store the type and version of revocation list that it was given, and if available the time the list was provided. It would also store the authorization information of the individual providing the authorization to use the revocation list. The platform would provide this information to the owner of the platform upon request. Thus the platform owner would be able to do an audit of the revocation lists that it had been, and thus detect if it had been given an inappropriate list.

When a platform is on one of the revocation lists, the platform will know that fact. In one embodiment, the platform will keep that information and any authorization information that was provided when the revocation list was submitted. In one embodiment the time of the request is also submitted and stored. In one embodiment, there is a policy associated with the revocation list that indicates when the platform is allowed to inform the owner of the platform that he was given a revocation list. For some types of uses, and types of revocation lists, it may be appropriate for the user to be provided immediate information that the platform was on a revocation list. For other types, the policy may indicate that some period of time must pass before the user is notified that his platform was on a revocation list. The platform could have a maximum time which could be indicated by any policy. This provides the property that the owner of a platform will be assured that if his platform is ever on some type of revocation list, he will eventually become informed of that. The platform owner could check this information by sending a request for any revocation list information to the platform. If the platform is a smart card, as in the case of a driver's license, the platform would need to be placed in a smart card reader to process this request.

In an alternate method, when a verifier asks for a signature, he gives a revocation identifier. In one embodiment, when a member is presented with a revocation identifier, the prover platform will limit signature denial to requests, including the same revocation identifier. The revocation identifier could be indicated by the low order bits of the value of B, for instance, the low order 40 bits. The verifier would indicate these low order bits of B, and the prover would use these low order bits of B, and select the rest of the bits of B randomly. The prover would then only provide a denial for signatures in which the $B_0$ matched these low order bits. In this way, verifier platforms could be placed into groups where two verifiers are in the same group if they used the same revocation identifier. Within a group, a verifier could tell other verifiers to reject a member key, but they could not tell verifiers outside the group to reject the member key. In one embodiment, this method may also include a limit on the number of issued denial of signature requests.

The previous application also includes a non-interactive method for Direct Proof. In addition, there have been other methods discovered for performing Direct Proof. One of these was presented by Brickell, Boneh, Chen, and Shacham and was called set signatures. Another was presented by Brickell, Camenisch, and Chen and was called Direct Anonymous Attestation. Another was described within co-pending U.S. application Ser. No. 11/778,804, entitled "An Apparatus and Method for Direct Anonymous Attestation From Bilinear Maps," filed on Jul. 17, 2007, and using computations over elliptic curves instead of modular exponentiation. All of these methods share the property that there is a random base option such that in the creation of the signature or the interactive proof, the member creates a pseudonym, $k=B^f$ in some finite group, such as the integers modulo Q for some prime integer Q. Thus, the method described in this invention for proving the denial of a signature can be applied to any of these signature or interactive methods as well.

Having disclosed exemplary embodiments and the best mode, modifications and variations may be made to the disclosed embodiments while remaining within the scope of the embodiments of the invention as defined by the following claims.

What is claimed is:

1. A method comprising:
   (a) verifying, by an anonymous hardware device, that membership of the anonymous hardware device within a trusted membership group is not revoked according to an authenticated revocation list received with an authentication request from a verifier; and
   (b) issuing, by the anonymous hardware device, a digital signature computed on a message received with the authentication request to the verifier if membership of the anonymous hardware device within a trusted membership group is verified in (a), the verifier to authenticate the digital signature according to a public key of the trusted membership group to enable a trusted member device to remain anonymous to the verifier.

2. The method of claim 1, wherein verifying further comprises:
   receiving a challenge request from the verifier including the revocation list having a plurality of pseudonym pairs $(B_1, K_1) \ldots (B_n, K_n)$ including a base value $B_i$ and a pseudonym value $K_i$ of a plurality of suspect signatures, where n is an integer greater than 1 and i is and integer from 1 to n;

verifying that n is less than a predetermined amount;

authenticating of a digital signature of the received revocation list according to a public key of a trusted revocation server;

verifying that the verifier is authorized to issue the revocation list to the hardware device according to a public key in a certificate issued within a certificate hierarchy of a root key for authorization of the device;

verifying that a private member key stored within the hardware device, does not match any one of a plurality of unknown, suspect keys $F_0 \ldots F_n$ used to form the suspect signatures without disclosure of the private member key or any unique device identification information of the hardware device; and issuing a denial of revocation if n is less than the predetermined amount.

3. The method of claim 1, further comprising:

initiating a proof of membership protocol in response to the received authentication request to prove membership within the trusted membership group to the verifier, the request including the revocation list having a plurality of revoked tokens;

authenticating the revocation list according to a public key of a trusted revocation server; and aborting the proof of membership protocol if a private member key stored within the anonymous hardware device was previously used to compute a revoked token within the revocation list.

4. The method of claim 1, wherein issuing further comprises:

computing a first signature of knowledge that the anonymous hardware device possesses a private member key issued by the issuer of the trusted membership group during a join procedure;

computing a second signature of knowledge that the private member key of the anonymous hardware device has not been revoked if the private member key was not used to compute a matching pseudonym pair of one of a plurality of suspect signatures within the revocation list received from the verifier; and combining the first signature of knowledge and the second signature of knowledge to form the digital signature on the message received with the authentication request.

5. The method of claim 4, wherein issuing further comprises:

selecting random values $R_i, \ldots, R_n$;

computing values of the form $U_i = B_i^{Ri} \bmod P$ and $V_i = K_i^{Ri} \bmod P$, where n is an integer greater than 1, i is a value from 1 to n and F is a private member key of the anonymous hardware device;

sending the values $(U_1, V_1, W_1), \ldots, (U_n, V_n, W_n)$ to the verifier; and proving to the verifier that there exists an $R_i$ such that $U_i = B_i^{Ri} \bmod P$ and $V_i = K_i^{Ri} \bmod P$ without disclosure of the private member key or any unique device identification information of the hardware device as a first signature of knowledge.

6. The method of claim 5, further comprising:

proving to the verifier that there exists a private member key F, such that $W_1 = U_1^F \bmod P, \ldots, W_n = U_n^F \bmod P$, and $K = B^F \bmod P$, without disclosure of the private member key or any unique device identification information of the hardware device as a second signature of knowledge.

7. A method comprising:

issuing a challenge request to an anonymous hardware to prove membership within a trusted membership group, the challenge request including a revocation list having a plurality of revoked tokens of a plurality of suspect signatures;

receiving a digital signature computed on a message received with the authentication request to the verifier if membership of the anonymous hardware device within a trusted membership group is verified;

authenticating the digital signature according to a public key of the trusted membership group to enable a trusted member device to remain anonymous to the verifier.

8. The method of claim 7, wherein authenticating further comprises:

verifying that the anonymous hardware device possesses cryptographic information issued from an issuer of the trusted membership group without determining the cryptographic information or any unique device identification information of the hardware device; and verifying that a private member key of the hardware device was not used to generate any one of a group of suspect signatures, held by a verifier, where suspect keys used to generate the suspect signature are unknown to the verifier without determining the private member key or any unique device identification information of the hardware device.

9. The method of claim 7, wherein prior to issuing the hardware challenge, the method comprises:

detecting unauthorized activity of an anonymous member device;

determining a base $B_0$ and a pseudonym $K_0$ of a suspect signature used to authenticate the device; and sending the $B_0$ and a pseudonym $K_0$ as a suspect signature generated with an unknown, suspect key $F_0$ to a trusted revocation to revoke membership of the device within the trusted membership group.

10. The method of claim 7, wherein authenticating further comprises:

(a) verifying a first signature of knowledge that the anonymous hardware device possesses a private member key issued by the issuer of the trusted membership group during a join procedure;

(b) verifying a second signature of knowledge that the private member key of the anonymous hardware device has not been revoked if the private member key was not used to compute a matching pseudonym pair of one of a plurality of suspect signatures within the revocation list received from the verifier; and (c) establishing authentication of the digital signature if the first and second signature of knowledge are verified, as determined in (a) and (b).

11. An apparatus comprising:

a flash memory to store cryptographic information form an issuer;

a trusted platform module (TPM) to convince a verifier that a TPM possesses cryptographic information from an issuer of a trusted membership group without disclosure of the cryptographic information or any unique device identification information of the apparatus; and digital signature logic to issue a signature on a message received with an authentication request from a verifier if membership of the anonymous hardware device within a trusted membership group is not revoked according to an authenticated revocation list received with an authentication request.

12. The apparatus of claim 11, wherein the trusted platform module comprises:
  denial of signature logic to receive a group denial of signature request, including plurality of pseudonym pairs $(B_1, K_1) \ldots (B_n, K_n)$ including a base value $B_i$ and a pseudonym value $K_i$ of plurality of suspect signatures from the verifier;
  authentication logic to prove a private member key stored within the hardware device used to construct a pseudonym, K, does not match any one of a plurality of unknown, suspect keys $F_0 \ldots F_n$ used to form the suspect signature, where n is an integer greater than 1 and i is and integer from 1 to n.

13. The apparatus of claim 11, wherein the trusted platform module comprises:
  key logic to receive a unique secret pair (c,F) from a certifying manufacturer of the apparatus where F is a signature key of the hardware device of the form $c^e$ mod P, where the pair (e, P) is a public key of the certifying manufacturer.

14. The apparatus of claim 11, wherein the apparatus comprises one of a smart card, a bank card, a credit card and an identification card having an integrated circuit including the TPM.

15. The apparatus of claim 11, further comprising:
  membership verification logic to determine whether membership of the anonymous hardware device within a trusted membership group is not revoked according to an authenticated revocation list received with an authentication request from a verifier.

16. A system comprising:
  a verifier platform coupled to a network; and
  an anonymous prover platform coupled to the network, comprising:
    a bus,
    a processor coupled to the bus,
    a chipset coupled to the bus, including a trusted platform module (TPM), in response to a challenge received over the network, the TPM to verify that membership of the anonymous hardware device within a trusted membership group is not revoked according to an authenticated revocation list received with an authentication request from a verifier and to issue a digital signature computed on a message received with the authentication request to the verifier if membership of the anonymous hardware device within a trusted membership group is verified.

17. The system of claim 16, wherein the verifier platform comprises:
  digital signature verification logic to verify a first signature of knowledge that the anonymous hardware device possesses a private member key issued by the issuer of the trusted membership group during a join procedure and to verify a second signature of knowledge that the private member key of the anonymous hardware device has not been revoked if the private member key was not used to compute a matching pseudonym pair of one of a plurality of suspect signatures within the revocation list received from the verifier to authenticate the digital signature.

18. The system of claim 16, wherein the trusted platform module comprises:
  denial of revocation logic to receive the denial of signature request, including plurality of pseudonym pairs $(B_1, K_1) \ldots (B_n, K_n)$ including a base value $B_i$ and a pseudonym value $K_i$ of plurality of suspect signatures from the verifier and to convince the verifier that a private member key F stored within the hardware device does not match any one of a plurality of unknown, suspect keys $F_0 \ldots F_n$ used to form the suspect signature, where n is an integer greater than 1 and i is and integer from 1 to n used to form the suspect signatures.

19. The system of claim 16, wherein the prover platform in Direct Proof comprises:
  key logic to generate a secret member key, F, according to a predetermined seed value;
  join logic to compute cryptographic parameters for receiving a group membership certificate c of the prover platform, the private signature key (F,c) of the prover platform including the secret member key F and cryptographic parameter c of the group membership certificate of the prover platform.

20. The system of claim 16 wherein the prover platform comprises an identification card having an integrated circuit including the TPM.

21. An article of manufacture including a machine readable storage medium having stored thereon instructions which may be used to program a system to perform a method comprising:
  (a) verifying, by an anonymous hardware device, that membership of the anonymous hardware device within a trusted membership group is not revoked according to an authenticated revocation list received with an authentication request from a verifier;
  (b) convincing the verifier that the anonymous hardware device possesses cryptographic information issued from an issuer of a trusted membership group without disclosure of the cryptographic information or any unique device identification information of the hardware device to the verifier if the membership of the anonymous hardware device within the trusted membership group is not revoked as determined in (a); and
  (c) convincing the verifier that membership of the anonymous hardware device within a trusted membership group is not revoked according to an authenticated revocation list received with an authentication request from a verifier without disclosure of any unique device identification information of the hardware device to enable a trusted member device to remain anonymous to the verifier.

22. The article of manufacture of claim 21, wherein the method further comprises:
  issuing a digital signature on a message received with the authentication request if the membership of the anonymous hardware device within the trusted membership group is not revoked as determined in (a).

23. The article of manufacture of claim 21, wherein convincing the verifier that the anonymous hardware device possesses cryptographic information further comprises:
  selecting random values $R_i, \ldots, R_n$;
  computing values of the form $U_i = B_i^{Ri}$ mod P, $V_i = K_i^{Ri}$ mod P, and $W_i = U_i^F$ mod P where n is an integer greater than 1, i is a value from 1 to n and F is a private member key of the anonymous hardware device;
  sending the values $(U_1, V_1, W_1), \ldots, (U_n, V_n, W_n)$ to the verifier; and
  proving to the verifier that there exists an $R_i$ such that $U_i = B_i^{Ri}$ mod P and $V_i = K_i^{Ri}$ mod P without disclosure of the private member key or any unique device identification information of the hardware device as a first signature of knowledge.

24. The article of manufacture of claim 23, further comprising:
  proving to the verifier that there exists a private member key F, such that $W_1 = U_1^F$ mod P, ..., $W_n = U_n^F$ mod P, and $K=B^F \mod P$, without disclosure of the private member key or any unique device identification information of the hardware device as a second signature of knowledge; and combining the first signature of knowledge and the second signature of knowledge to form a digital signature on the message received with the authentication request to convince the verifier that membership of the anonymous hardware device within a trusted membership group is not revoked.

25. The article of manufacture of claim 21, wherein verifying further comprises:

authenticating of a digital signature of the received revocation list according to a public key of a trusted revocation server;

verifying that the verifier is authorized to issue the revocation list to the hardware device; and verifying that a private member key stored within the hardware device, does not match any one of a plurality of unknown, suspect keys $F_0 \ldots F_n$ used to form the suspect signatures without disclosure of the private member key or any unique device identification information of the hardware device.

26. An article of manufacture including a machine readable storage medium having stored thereon instructions which may be used to program a system to perform a method, comprising:

issuing a challenge request from the verifier including the revocation list having a plurality of pseudonym pairs $(B_1, K_1) (B_n, K_n)$ including a base value $B_i$ and a pseudonym value $K_i$ of a plurality of suspect signatures;

verifying that a hardware device possesses cryptographic information without disclosing any unique device identification information of the hardware device; and verifying that a cryptographic key of the hardware device was not used to generate any one of a group of suspect signatures, held by a verifier, where suspect keys used to generate the suspect signature is unknown to the verifier without determining any unique device identification information of the hardware device to enable a trusted member device to remain anonymous to the verifier.

27. The article of manufacture of claim 26, wherein verifying that the hardware device possesses cryptographic information comprises:

detecting compromised content of the verifier;

determining a base $B_0$ and a pseudonym $K_0$ of a suspect direct proof signature used to receive the compromised content; and storing the $B_0$ and a pseudonym $K_0$ as a suspect signature generated with an unknown, suspect key $F_0$.

28. The article of manufacture of claim 26, wherein verifying that the cryptographic key was not used to generate the suspect signature comprises:

(a) providing the hardware device with a denial of signature request including a plurality of pseudonym pairs $(B_1, K_1) \ldots (B_n, K_n)$ including a base value $B_i$ and a pseudonym value $K_i$ of a plurality of suspect signatures from the verifier;

(b) verifying that a cryptographic key F of the hardware device does not match any one of a plurality of unknown, suspect keys $F_0 \ldots F_n$ used to form the suspect signatures, where n is an integer greater than 1 and i is and integer from 1 to n.

29. The article of manufacture of claim 26, wherein verifying that the hardware device possesses cryptographic information comprises:

verifying a first signature of knowledge that the anonymous hardware device possesses a private member key issued by the issuer of the trusted membership group during a join procedure.

30. The article of manufacture of claim 26, wherein verifying that the cryptographic key was not used to generate the suspect signature comprises:

verifying a second signature of knowledge that the private member key of the anonymous hardware device has not been revoked if the private member key was not used to compute a matching pseudonym pair of one of a plurality of suspect signatures within the revocation list received from the verifier.

* * * * *